United States Patent
Borucki

(10) Patent No.: US 10,380,660 B2
(45) Date of Patent: Aug. 13, 2019

(54) TECHNIQUES FOR AUTOMATED PROFILE-BASED TRANSACTION PROCESSING

(75) Inventor: Robert Thomas Borucki, Mesa, AZ (US)

(73) Assignee: NCR Corporation, Atlanta, GA (US)

( * ) Notice: Subject to any disclaimer, the term of this patent is extended or adjusted under 35 U.S.C. 154(b) by 1350 days.

(21) Appl. No.: 12/924,841

(22) Filed: Oct. 6, 2010

(65) Prior Publication Data

US 2012/0089426 A1 Apr. 12, 2012

(51) Int. Cl.
*G06Q 30/06* (2012.01)
*G06Q 30/02* (2012.01)

(52) U.S. Cl.
CPC ......... *G06Q 30/06* (2013.01); *G06Q 30/0201* (2013.01)

(58) Field of Classification Search
None
See application file for complete search history.

(56) References Cited

U.S. PATENT DOCUMENTS

| | | | |
|---|---|---|---|
| 2002/0120729 A1* | 8/2002 | Faccin et al. | 709/223 |
| 2005/0192897 A1* | 9/2005 | Rogers et al. | 705/40 |
| 2006/0229959 A1* | 10/2006 | Heidingsfeld et al. | 705/35 |
| 2009/0077135 A1* | 3/2009 | Yalamanchi et al. | 707/200 |
| 2011/0138050 A1* | 6/2011 | Dawson et al. | 709/226 |

\* cited by examiner

*Primary Examiner* — Tonya Joseph
(74) *Attorney, Agent, or Firm* — Schwegman, Lundberg & Woessner

(57) ABSTRACT

Techniques for automated profile-based transaction processing are provided. A customer uses a cloud-based service to establish one or more transaction profiles. When that customer subsequently accesses a self-service device to perform a transaction, the cloud-based service is automatically contacted and the transaction is automatically completed on behalf of the customer at the self-service device using a particular one of the customer's transaction profiles.

7 Claims, 3 Drawing Sheets

TECHNIQUES FOR AUTOMATED PROFILE-BASED TRANSACTION PROCESSING

BACKGROUND

Consumers are increasingly using kiosks to conduct business with enterprises. The kiosks come in a variety of sizes and are used for a variety of purposes. Some kiosks are drive through, such as fast food establishments, pharmacies, banks, and the like. Other kiosks are stationary located in gas stations, grocery stores, department stores, and the like.

In fact, customers perform self-service transactions every day. Kiosks and other self-service devices provide easy-to-use interfaces, which are designed to be used by the widest range of users, from first timers to frequent users. For example, in air travel, the check-in activity is often carried out via a self-service kiosk, web check-in application, or through a mobile device. On subsequent trips, the user must still step through the entire process for checking in, as the system has no awareness that the user has been there before.

In short, kiosks and other self-service devices require the customer to step through their options and interface screens for each transaction regardless how well-established the customer is with a particular enterprise and regardless of how often the customer interacts with that particular enterprise's kiosks and/or self-service devices. This is redundant and inefficient and in some cases annoying to the customer.

SUMMARY

In various embodiments, techniques for automated profile-based transaction processing with an enterprise are presented. According to an embodiment, a method for automated profile-based transaction processing is provided.

Specifically, a transaction profile is established; the transaction profile defines options and settings for completing a transaction or modifying the transaction with an enterprise and the transaction to be subsequently initiated at a self-service device. Next, the transaction profile is associated with a particular customer and a transaction type for the transaction to create a transaction profile record for the particular customer. Finally, the transaction profile record is recorded for usage when the transaction is subsequently initiated at the self-service device by the particular customer to complete or modify the transaction with the enterprise.

DETAILED DESCRIPTION

Figure 1:
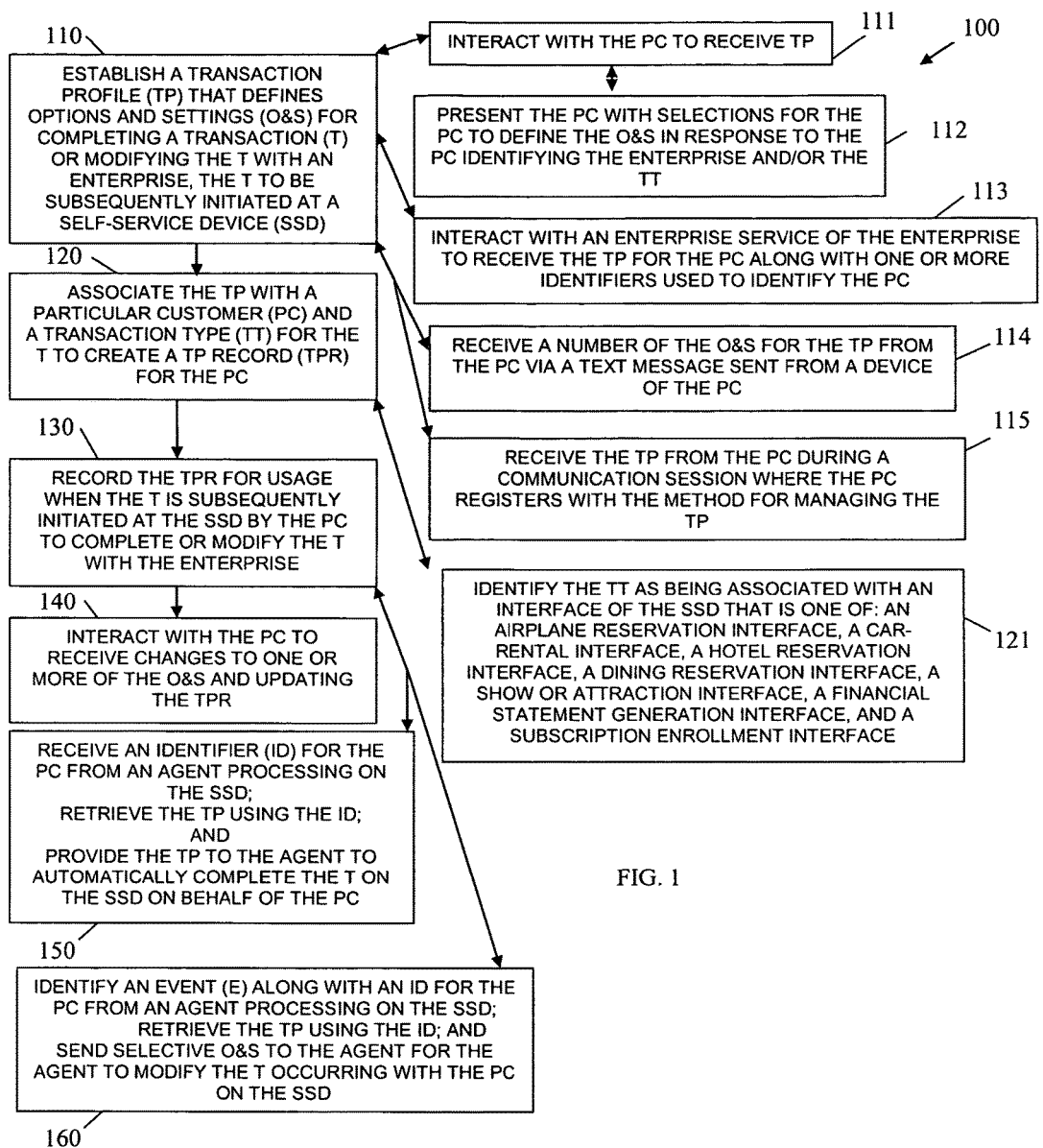
FIG. 1 is a diagram of a method for automated profile-based transaction processing, according to an example embodiment.

FIG. 1 is a diagram of a method 100 for automated profile-based transaction processing, according to an example embodiment. The method 100 (hereinafter "cloud-transaction processing service") is implemented as instructions residing on a non-transitory computer-readable (processor-readable) storage medium and executed by one or more processors. The processors are specifically configured and programmed to process the cloud-transaction processing service. The cloud-transaction processing service operates over a network. The network is wired, wireless, or a combination of wired and wireless.

The cloud-transaction processing service executes on one or more processors over the network in a cloud processing environment.

Cloud computing is often defined as computing capabilities that provide an abstraction between computing resources and the underlying technical architecture (e.g., servers, storage, networks), enabling convenient, on-demand network access to a shared pool of configurable computing resources that can be rapidly provisioned and released with minimal management effort or service provider interaction. From the perspective of the user, where and how a computing resource is irrelevant and transparent in cloud computing.

As used herein a "cloud processing environment" refers to a set of cooperating computing resources, such as machines, storage, software libraries, software systems, etc. that form a logical computing infrastructure.

At 110, the cloud-transaction processing service establishes a transaction profile. The transaction profile defines options and settings for completing a transaction or for modifying the transaction with an enterprise. The transaction to be subsequently initiated at a self-service device.

The settings and options are preferences for a particular customer. For instance, an option may define a "seat location" for an airline (enterprise) and the option associated with the seat location (option) may include a value, such as aisle seat. An option defines a parameter for an interface of an enterprise that a customer accesses via a self-service device, such as a kiosk. A setting provides a specific value for a given option. A single option can include more than one setting values.

In an embodiment, the preferences for the transaction profile is for an airline check-in interface at a kiosk within the airport and includes, but is not limited to: seat type (window, aisle, exit row, etc.), whether or not to accept upgrade offers from the airlines, and additional personal information that may qualify or disqualify a customer for an exit row assigned seat of an aircraft. So, the preferences can also include information that answers questions of the airline interface associated with the kiosk.

The cloud-transaction processing service (as will be demonstrated and discussed herein and below) enables automated processing of self-service functions for subscribing or qualifying customers via profiles, the transaction profiles. Qualified customers are those who, through information contained in their transaction profiles, meet business rules of the service provider (enterprise) for the function of an interface of the service provider under consideration. The interface processing on a self-service device used by the service provider.

For qualified customers, the cloud-transaction processing service can automatically step through interfaces of self-service devices to automatically answer questions and complete information that would otherwise require a customer to manually enter such information and answer such questions each and every time the customer interacts with those self-service devices. So for the airline check-in example the transaction profile permits the cloud-transaction processing service to automatically do such things as know in advance: that a customer has a qualified profile; that the customer wants to check in; what airline, flight number, etc. that the customer wants to check in for; the business rules of that airline pertaining to the check-in process; and the check-in preferences for the customer.

Thus, the cloud-transaction processing service can use one or more profiles of the customer to automatically perform the check-in task at a designated time and stepping through what would otherwise be a manual self-service task manually performed through a user interface of a self-service device. The cloud-transaction processing service can request desired seat assignments, accept warnings regarding exit row seating, accept automatic upgrades, etc. Moreover, if a form a payment is available via one of the transaction profiles, the cloud-transaction processing service can also process purchased upgrades and other ancillary transactions on behalf of the customer, automatically and subject to the customer's original preferences and the enterprise's business rules. However, some transactions can be performed by the traveler or partially performed by the traveler. For instance, the traveler may use the profile to partially perform a check in skipping some steps of the process but still manually interacting with the check-in interface for other steps. Thus, total automation or partial automation can be achieved depending upon the preferences and/or self-service interface being used by a customer (traveler).

It is to be understood that the cloud-transaction processing service is not limited to airline check in; rather, the cloud-transaction processing service can be used for any function facilitated by a self-service device and its interface.

It is also noted that a customer can have multiple transaction profiles established with the cloud-transaction processing service. The profiles can also be hierarchically arranged, such that a global profile can be used to assist in at least partially populating particular other profiles.

Moreover, in some cases aspects of the transaction profiles can be overridden by a customer/traveler for any given transaction. So, a customer may say for Delta I prefer a window seat but for Jet Blue I prefer an aisle seat. The overrides can be automatic and included in aspects of the profile or the overrides can be manually driven at the time of the transaction on case-by-case bases by the traveler.

According to an embodiment, at 111, the cloud-transaction processing service interacts with a particular customer to receive the transaction profile. Here, the particular customer access any number of front-end interfaces associated with the cloud-transaction processing service and interacts via a particular interface (chosen by the particular customer) to provide the transaction profile.

Continuing with the embodiment of 111 and at 112, the cloud-transaction processing service presents the particular customer with selections for particular customer to define the options and settings based on the particular customer identifying the enterprise and/or a transaction type for a set of transactions for a given self-service interface. In other words, the cloud-transaction processing service can guide the particular customer through the process of selecting desired settings and options for a given interface of a self-service and its set of functions.

In another situation, at 113, the cloud-transaction processing service interact with an enterprise service of the enterprise to receive the transaction profile for the particular customer along with one or more identifiers to uniquely identify the particular customer. Here, it is a service of an enterprise that provides all or some of the transaction profile for the particular customer. For example, a set of preferences may be stored for a customer or identified for a customer with a particular enterprise and the customer can indicate to share that with the cloud-transaction processing service, which is done via an enterprise service. It may also be that the customer interacts once with a self-service device and interface of an enterprise and then via that interface indicates that the preferences and selections are to be shared and communicated to the cloud-transaction processing service.

In yet another situation, at 114, the cloud-transaction processing service receives a number of the options and settings for the transaction profile from the particular customer via a text message (one form of front-end interface to the cloud-transaction processing service) that is sent from a device of the particular customer (such as via a phone, a computer, a personal digital assistant (PDA), tablet (iPad®), and the like).

In an embodiment, at 115, the cloud-transaction processing service receives the transaction profile from the particular customer during a communication session where the particular customer registers or subscribes with the cloud-transaction processing service for managing the transaction profile.

At 120, the cloud-transaction processing service associates the transaction profile with the particular customer and a transaction type for the transaction to create a transaction record for the particular customer.

It is noted that the transaction is a set of repeatable transactions for a given transaction type and the transaction type identifies a given self-service interface for one or more self-service devices that process instances of the self-service interface.

According to an embodiment, at 121, the cloud-transaction processing service identifies the transaction type as being associated with an interface of the self-service device. The interface can be one of: an airline reservation interface (as discussed above), a car-rental interface, a hotel reservation interface, a show or attraction interface (movies, sporting events, theatre, shows, etc.), a financial statement generation interface, and a subscription enrollment interface.

At 130, the cloud-transaction processing service records the transaction profile record for repeatable usage. So, when the transaction is subsequently initiated (can occur multiple times) at the self-service device (or multiple self-service devices) by the particular customer to either fully complete or modify the transaction with the enterprise.

According to an embodiment, at 140, the cloud-transaction processing service interacts with the particular customer for purposes of receiving changes to one or more of the options and settings. The changes are then updated to the transaction processing record.

In another circumstance, at 150, the cloud-transaction processing service receives an identifier for the particular customer from an agent (discussed in greater detail below with reference to the method 200 of the FIG. 2) processing on the self-service device. In response to this communication with the agent, the cloud-transaction processing service retrieves the transaction profile using the customer identifier. Next, the cloud-transaction processing service provides the transaction profile to the agent to automatically complete the transaction on the self-service device on behalf of the particular customer.

In another case, at 160, the cloud-transaction processing service identifies an event along with the customer identifier for the particular customer from the agent processing on the self-service device. Next, the cloud-transaction processing service retrieves the transaction profile using the customer identifier and then sends selective options and settings to the agent for the agent to modify the transaction occurring with the particular customer on the self-service device.

Figure 2:
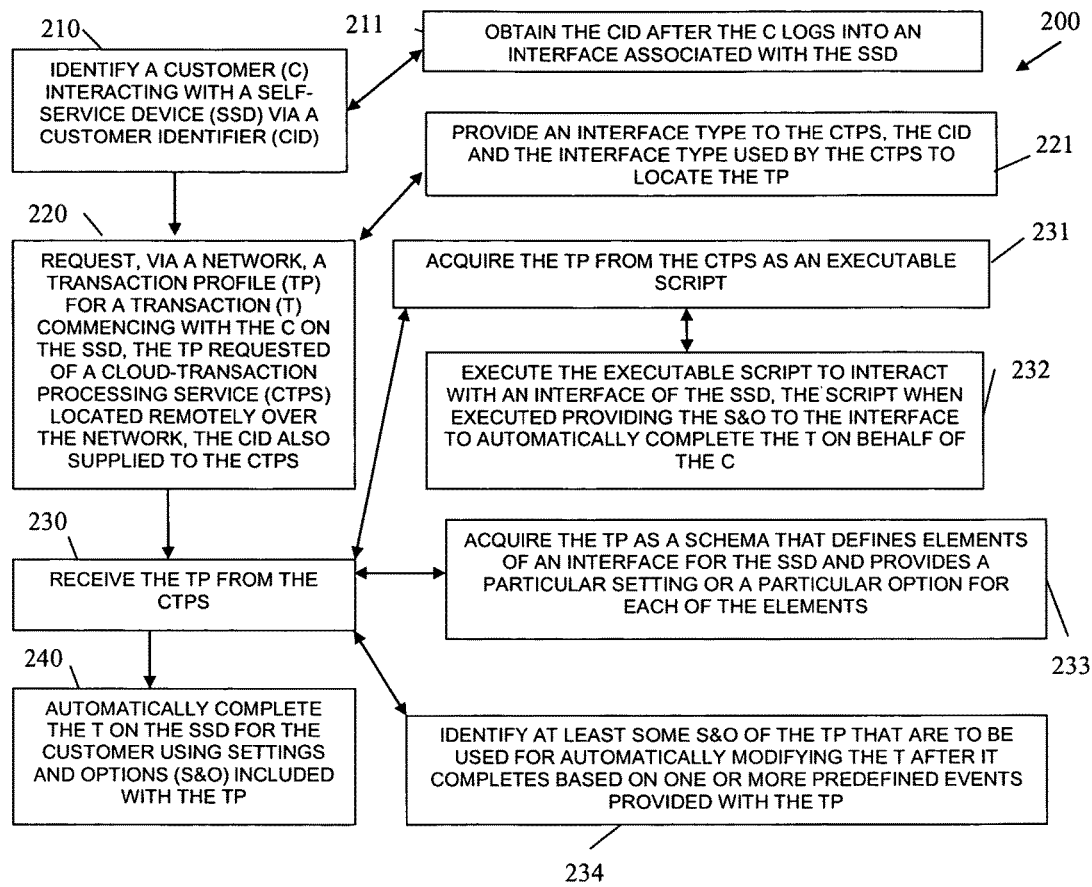
FIG. 2 is a diagram of another method for automated profile-based transaction processing, according to an example embodiment.

FIG. 2 is a diagram of another method 200 for automated profile-based transaction processing, according to an example embodiment. The method 200 (hereinafter "self-service transaction agent") is implemented as instruction within a non-transitory computer-readable (processor-readable) storage medium that executes on one or more processors of a self-service device (e.g., kiosk, etc.); the processors of the self-service device are specifically configured to execute the self-service transaction agent. The self-service transaction agent is operational over a network; the network is wired, wireless, or a combination of wired and wireless.

The self-service transaction agent is presented from the processing perspective of the self-service device operated by a customer of an enterprise (e.g., end-user). Conversely, the cloud-transaction processing service represented by the method 100 of the FIG. 1 was presented from the perspective of cloud-based processors in a cloud-processing environment that interact with the self-service device via the self-service transaction agent. In a sense, the cloud-transaction processing service is network-server based and the self-service transaction agent is client-machine based.

At 210, the self-service transaction agent identifies a customer interacting with a self-service device via a customer identifier.

According to an embodiment, at 211, the self-service transaction agent obtains the customer identifier after the customer logs into an interface associated with the self-service device. So, the agent acquires the customer identifier after the customer is identified by the self-service transaction agent.

At 220, the self-service transaction agent requests, via the network, a transaction profile for a transaction commencing with the customer on the self-service device. The transaction profile requested of a cloud-transaction processing service located remotely over the network, such as the cloud-transaction processing service discussed above with reference to the method 100 of the FIG. 1. The self-service transaction agent also provides the customer identifier to the cloud-transaction processing service.

In an embodiment, at 221, the self-service transaction agent provides an interface type or even a self-service device type to the cloud-transaction processing service. The customer Identifier and the interface type used by the cloud-transaction processing service to locate the transaction profile.

At 230, the self-service transaction agent receives the transaction profile back from the cloud-transaction processing service.

According to an embodiment, at 231, the self-service transaction agent acquires the transaction profile from the cloud-transaction processing service as an executable script.

Continuing with the embodiment of 231 and at 232, the self-service transaction agent executes the executable script to interact with an interface of the self-service device. The script when executed provides the settings and options to the interface to automatically complete the transaction on behalf of the customer. Here, the script engages an Application Programming Interface (API) of the self-service device and runs through its questions and functions providing the appropriate responses using the settings and options of the transaction profile.

In another case, at 233, the self-service transaction agent acquires the transaction profile as a schema that defines elements of an interface requiring inputs or responses. The schema is for the interface of the self-service device and provides a particular setting and/or particular option for each of the elements.

In another situation, at 234, the self-service transaction agent identifies at least some settings and options of the transaction profile that are to be used for automatically modifying the transaction after it completes based on one or more predefined events provided with the transaction profile. So, the transaction profile can be used to adjust or enhance options of the transaction. This situation was discussed, by way of example above with reference to the method 100 of the FIG. 1 where upgraded seats on an airline were discussed. Of course, it is noted the processing here is not specifically limited to airline transactions.

Finally, at 240, the self-service transaction agent automatically completes the transaction on the self-service device for the customer using the settings and options included with the transaction profile.

Figure 3:
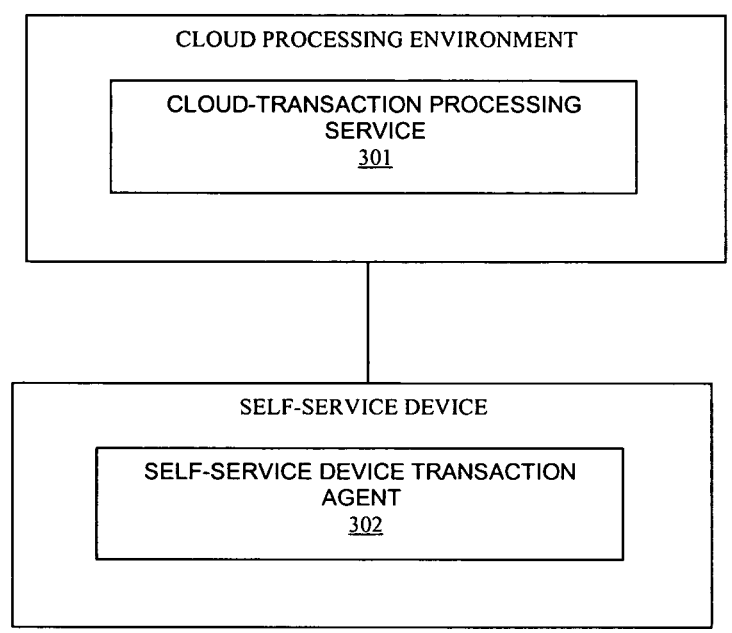
FIG. 3 is a diagram of an automated transaction processing system, according to an example embodiment.

FIG. 3 is a diagram of an automated transaction processing system 300, according to an example embodiment. The automated transaction processing system 300 includes one or more processors that are specifically configured to perform, inter alia, the processing associated with the methods 100 and 200 of the FIGS. 1 and 2, respectively. The automated transaction processing system 300 may also include a variety of other hardware components, such as network adapters, memory, display screen(s), input mechanisms, and the like. Furthermore, the automated transaction processing system 300 is operational over a network and the network can be wired, wireless, or a combination of wired and wireless.

The automated transaction processing system 300 includes a cloud-transaction processing service 301 and a self-service device transaction agent 302. Each of these and their interactions with one another will now be discussed in turn.

A cloud processing environment includes one or more processors and is configured and programmed with the cloud-transaction processing service 301. The cloud-transaction processing service 301 executes on or within the cloud processing environment. Example processing associated with the cloud-transaction processing service 301 was presented in detail above with respect to the method 100 of the FIG. 1.

The cloud-transaction processing service 301 is configured to register a particular customer with a particular interface of a self-service device. The cloud-transaction processing service 301 is also configured to acquire a transaction profile having settings and options for automatically completing or modifying transaction on the particular interface for the particular customer.

The self-service device includes one or more processors and is configured and programmed with the self-service device transaction agent 302. The self-service device transaction agent 302 executes on the self-service device. Example processing associated with the self-service device transaction agent 302 was presented in detail above with reference to the method 200 of the FIG. 2.

The self-service device transaction agent 302 is configured to identify the particular customer accessing the self-service device and configured to obtain the transaction profile from the cloud-transaction processing service 301 and then use the settings and options to automatically complete or modify the transactions via the particular interface on behalf of the particular customer.

According to an embodiment, the cloud-transaction processing service 301 is configured to manage multiple other customers having multiple other transaction profiles associated with multiple disparate self-service devices.

In an embodiment, the self-service device is a kiosk.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method programmed in a non-transitory processor-readable medium and to execute on one or more processors configured to execute the method, comprising:
   identifying a customer interacting with a self-service device via a customer identifier;
   requesting, via a network, a transaction profile for a transaction commencing with the customer on the self-service device, the transaction profile requested of a cloud-transaction processing service located remotely over the network, the customer identifier also supplied to the cloud-transaction processing service, wherein requesting further includes providing an interface type to the cloud-transaction processing service, the customer identifier and the interface type used by the cloud-transaction processing service to locate the transaction profile;
   receiving the transaction profile from the cloud-transaction processing service, wherein receiving further includes acquiring the transaction profile from the cloud-transaction processing service as an executable script; and
   automatically completing the transaction on the self-service device for the customer by processing settings and options defined as preferences within the transaction profile and at least some of the preferences providing information for automatically answering-questions on behalf of the customer that are being asked by a cloud interface for the cloud-transaction processing service during the transaction that the customer is engaged in at the self-service device, and wherein automatically completing the transaction further includes processing the transaction profile as multiple profiles arranged hierarchically with at least one of the multiple profiles providing a global profile processed to partially populate values for the transaction defined in other ones of the multiple profiles, wherein automatically completing further includes executing the executable script to interact with an interface of the self-service device, the script when executed providing the settings and the options to the interface to automatically complete the transaction on behalf of the customer.

2. The method of claim 1, wherein identifying the customer further includes obtaining the customer identifier after the customer logs into an interface associated with the self-service device.

3. The method of claim 1, wherein receiving further includes acquiring the transaction profile as a schema that defines elements of an interface for the self-service device and provides a particular setting or a particular option for each of the elements.

4. The method of claim 1, wherein receiving further includes identifying at least some settings and options of the transaction profile that are to be used for automatically modifying the transaction after it completes based on one or more predefined events provided with the transaction profile.

5. A system, comprising:
   a cloud processing environment having one or more processors and configured and programmed with a cloud-transaction processing service to execute the cloud-transaction processing service; and
   a self-service device having one or more processors and configured and programmed with a self-service device transaction agent to execute the self-service device transaction agent;
   the cloud-transaction processing service is configured to register a particular customer with a particular interface of the self service device and acquire a transaction profile having settings and options defining preferences of the particular customer for automatically completing or modifying transactions on the particular interface for the particular customer, the self-service device transaction agent configured to identify the particular customer accessing the self-service device and obtain the transaction profile from the cloud-transaction processing service and then use the preferences to automatically modify the transactions via the particular interface on behalf of the particular customer, and at least some of the preferences processed for automatically answering questions on behalf of the customer being asked by the particular interface for the cloud-transaction processing service during the transaction that the customer is engaged in at the self-service device, and wherein automatic completion of the transaction further includes processing the transaction profile as multiple profiles arranged hierarchically with at least one of the multiple profiles providing a global profile processed to partially populate values for the transaction defined in other ones of the multiple profiles.

6. The system of claim 5, wherein the cloud-transaction processing service is configured to manage multiple other customers having multiple other transaction profiles associated with multiple other disparate self-service devices.

7. The system of claim 5, wherein the self-service device is a kiosk.

* * * * *